(12) United States Patent
Sheehan et al.

(10) Patent No.: US 7,075,899 B2
(45) Date of Patent: Jul. 11, 2006

(54) SYSTEM AND METHOD FOR PROVIDING PRIVATE IN-BAND DATA TO DIGITAL SET-TOP BOXES IN A BROADCAST ENVIRONMENT

(75) Inventors: Patrick M. Sheehan, Jamison, PA (US); Michael G. Cristofalo, Doyelstown, PA (US)

(73) Assignee: ACTV, Inc., San Francisco, CA (US)

( * ) Notice: Subject to any disclaimer, the term of this patent is extended or adjusted under 35 U.S.C. 154(b) by 0 days.

(21) Appl. No.: 10/152,746

(22) Filed: May 21, 2002

(65) Prior Publication Data

US 2003/0219081 A1    Nov. 27, 2003

(51) Int. Cl.
*H04L 25/00* (2006.01)
(52) U.S. Cl. .................. 370/257; 375/340; 348/729
(58) Field of Classification Search ................ 375/259, 375/257, 316, 340; 348/727, 734, 714–716, 348/6, 10, 86, 87, 436, 437
See application file for complete search history.

(56) References Cited

U.S. PATENT DOCUMENTS

| | | | |
|---|---|---|---|
| 2,612,553 A | 9/1952 | Homrighous |
| 2,777,901 A | 1/1957 | Dostert |
| 2,826,828 A | 3/1958 | Hamilton |
| 2,908,767 A | 10/1959 | Fritzinger |
| 2,921,385 A | 1/1960 | Hamilton |
| 3,008,000 A | 11/1961 | Morchand |
| 3,020,360 A | 2/1962 | Gratian et al. |
| 3,194,895 A | 7/1965 | Treadwell |
| 3,221,098 A | 11/1965 | Feldman et al. |
| 3,245,157 A | 4/1966 | Laviana |
| 3,255,536 A | 6/1966 | Livingston |
| 3,273,260 A | 9/1966 | Walker |
| 3,284,923 A | 11/1966 | Leslie |
| 3,343,280 A | 9/1967 | Tolnai |
| 3,366,731 A | 1/1968 | Wallerstein |
| 3,387,084 A | 6/1968 | Hine et al. |
| 3,440,342 A | 4/1969 | Beltrami |
| 3,477,144 A | 11/1969 | Stillit |
| 3,484,950 A | 12/1969 | Serrell et al. |
| 3,485,946 A | 12/1969 | Jackson et al. |

(Continued)

FOREIGN PATENT DOCUMENTS

AU    747337 B2    6/1999

(Continued)

OTHER PUBLICATIONS

International Search Report, International Application No. PCT/US03/15817, Jul. 31, 2003, pp. 1-4.

(Continued)

*Primary Examiner*—Dac V. Ha
(74) *Attorney, Agent, or Firm*—Morrison & Foerster LLP (57) ABSTRACT

The present invention involves a system, apparatus, and method for providing private in-band data to digital set-top boxes in a broadcast environment. In one example, a digital set-top box conforming to the present invention includes one or more programmatic identifiers, such as a manufactures identification, a product identification, and software application identifications. On a channel and at a time, the set-top box receives a broadcast transmission of in-band update data, such as profile data or software code, with matching identifiers. Upon receipt of the broadcast transmission having matching identifiers, the in-band update data is stored in a memory of the set-top box or the appropriate application is modified.

30 Claims, 8 Drawing Sheets

U.S. PATENT DOCUMENTS

| | | |
|---|---|---|
| 3,538,621 A | 11/1970 | Mayeda |
| 3,546,791 A | 12/1970 | Koos et al. |
| 3,566,482 A | 3/1971 | Morchand |
| 3,575,861 A | 4/1971 | Flossmoor, III |
| 3,602,582 A | 8/1971 | Torricelli |
| 3,623,238 A | 11/1971 | Laplume et al. |
| 3,643,217 A | 2/1972 | Morphew et al. |
| 3,665,615 A | 5/1972 | Laplume |
| 3,708,891 A | 1/1973 | Rosov |
| 3,725,571 A | 4/1973 | Justice |
| 3,730,980 A | 5/1973 | Kirk, Jr. |
| 3,757,225 A | 9/1973 | Ulicki |
| 3,763,377 A | 10/1973 | Weston |
| 3,763,577 A | 10/1973 | Goodson |
| 3,774,316 A | 11/1973 | Meier |
| 3,814,841 A | 6/1974 | Ulicki |
| 3,825,674 A | 7/1974 | Justice |
| 3,833,760 A | 9/1974 | Tickle |
| 3,849,594 A | 11/1974 | Justice |
| 3,857,999 A | 12/1974 | Justice |
| 3,860,745 A | 1/1975 | Takada |
| 3,902,007 A | 8/1975 | Justice |
| 3,916,092 A | 10/1975 | Justice |
| 3,936,595 A | 2/1976 | Yanagimachi et al. |
| 3,947,972 A | 4/1976 | Freeman |
| 3,988,528 A | 10/1976 | Yanagimachi et al. |
| 3,991,266 A | 11/1976 | Baer |
| 4,034,990 A | 7/1977 | Baer |
| 4,040,088 A | 8/1977 | Hannan |
| 4,044,380 A | 8/1977 | Justice et al. |
| 4,078,316 A | 3/1978 | Freeman |
| 4,199,781 A | 4/1980 | Doumit |
| 4,245,245 A | 1/1981 | Matsumoto et al. |
| 4,264,924 A | 4/1981 | Freeman |
| 4,264,925 A | 4/1981 | Freeman et al. |
| 4,290,142 A | 9/1981 | Schnee et al. |
| 4,292,649 A | 9/1981 | Macheboeuf |
| 4,305,131 A | 12/1981 | Best |
| 4,331,974 A | 5/1982 | Cogswell et al. |
| 4,333,152 A | 6/1982 | Best |
| 4,361,730 A | 11/1982 | Barber et al. |
| 4,381,522 A | 4/1983 | Lambert |
| 4,399,329 A | 8/1983 | Wharton |
| 4,422,105 A | 12/1983 | Rodesch et al. |
| 4,439,784 A | 3/1984 | Furukawa et al. |
| 4,445,137 A | 4/1984 | Panofsky |
| 4,445,187 A | 4/1984 | Best |
| 4,507,680 A | 3/1985 | Freeman |
| 4,516,156 A | 5/1985 | Fabris et al. |
| 4,530,008 A | 7/1985 | McVoy |
| 4,536,791 A | 8/1985 | Campbell et al. |
| 4,546,382 A | 10/1985 | McKenna et al. |
| 4,555,730 A | 11/1985 | Briggs |
| 4,569,026 A | 2/1986 | Best |
| 4,571,640 A | 2/1986 | Baer |
| 4,573,072 A | 2/1986 | Freeman |
| 4,574,305 A | 3/1986 | Campbell et al. |
| 4,591,248 A | 5/1986 | Freeman |
| 4,599,611 A | 7/1986 | Bowker et al. |
| 4,602,279 A | 7/1986 | Freeman |
| 4,616,261 A | 10/1986 | Crawford et al. |
| 4,625,235 A | 11/1986 | Watson |
| 4,635,132 A | 1/1987 | Nakamura |
| 4,644,515 A | 2/1987 | Allebest et al. |
| 4,647,980 A | 3/1987 | Steventon et al. |
| 4,665,431 A | 5/1987 | Cooper |
| 4,694,490 A | 9/1987 | Harvey et al. |
| 4,701,896 A | 10/1987 | Allebest et al. |
| 4,704,725 A | 11/1987 | Harvey et al. |
| 4,706,121 A | 11/1987 | Young et al. |
| 4,733,301 A | 3/1988 | Wright, Jr. |
| 4,734,764 A | 3/1988 | Pocock et al. |
| 4,750,036 A | 6/1988 | Martinez |
| 4,763,317 A | 8/1988 | Lehman et al. |
| 4,768,087 A | 8/1988 | Taub et al. |
| 4,777,529 A | 10/1988 | Schultz |
| 4,780,757 A | 10/1988 | Bryer et al. |
| 4,780,758 A | 10/1988 | Lin et al. |
| RE32,776 E | 11/1988 | Saylor |
| 4,785,349 A | 11/1988 | Keith et al. |
| 4,786,967 A | 11/1988 | Smith, III et al. |
| 4,807,031 A | 2/1989 | Broughton et al. |
| 4,816,905 A | 3/1989 | Tweedy et al. |
| 4,821,101 A | 4/1989 | Short |
| 4,839,743 A | 6/1989 | Best et al. |
| 4,846,693 A | 7/1989 | Baer |
| 4,847,690 A | 7/1989 | Perkins |
| 4,847,698 A | 7/1989 | Freeman |
| 4,847,699 A | 7/1989 | Freeman |
| 4,847,700 A | 7/1989 | Freeman |
| 4,855,827 A | 8/1989 | Best |
| 4,862,268 A | 8/1989 | Campbell et al. |
| 4,870,591 A | 9/1989 | Cicciarelli et al. |
| 4,875,096 A | 10/1989 | Baer et al. |
| 4,876,592 A | 10/1989 | Von Kohorn |
| 4,884,974 A | 12/1989 | DeSmet |
| 4,894,789 A | 1/1990 | Yee |
| 4,905,094 A | 2/1990 | Pocock et al. |
| 4,916,633 A | 4/1990 | Tychonievich et al. |
| 4,918,516 A | 4/1990 | Freeman |
| 4,918,620 A | 4/1990 | Ulug |
| 4,924,303 A | 5/1990 | Brandon et al. |
| 4,926,255 A | 5/1990 | Von Kohorn |
| 4,930,019 A | 5/1990 | Chu |
| 4,941,040 A | 7/1990 | Pocock et al. |
| 4,949,170 A | 8/1990 | Yanagidaira et al. |
| 4,965,825 A | 10/1990 | Harvey et al. |
| 4,967,368 A | 10/1990 | Bolling et al. |
| 4,972,328 A | 11/1990 | Wu et al. |
| 4,975,771 A | 12/1990 | Kassatly |
| 4,987,486 A | 1/1991 | Johnson et al. |
| 4,988,111 A | 1/1991 | Gerlitz et al. |
| 4,989,233 A | 1/1991 | Schakowsky et al. |
| 4,989,234 A | 1/1991 | Schakowsky et al. |
| 4,991,011 A | 2/1991 | Johnson et al. |
| 4,994,908 A | 2/1991 | Kuban et al. |
| 4,995,036 A | 2/1991 | Copen et al. |
| 5,001,554 A | 3/1991 | Johnson et al. |
| 5,010,400 A | 4/1991 | Oto |
| 5,010,500 A | 4/1991 | Makkuni et al. |
| 5,014,125 A | 5/1991 | Pocock et al. |
| 5,023,707 A | 6/1991 | Briggs |
| 5,027,400 A | 6/1991 | Baji et al. |
| 5,033,969 A | 7/1991 | Kamimura |
| 5,034,807 A | 7/1991 | Von Kohorn |
| 5,043,891 A | 8/1991 | Goldstein et al. |
| 5,051,822 A | 9/1991 | Rhoades |
| 5,053,883 A | 10/1991 | Johnson |
| 5,055,924 A | 10/1991 | Skutta |
| 5,057,915 A | 10/1991 | Von Kohorn |
| 5,068,733 A | 11/1991 | Bennett |
| 5,077,607 A | 12/1991 | Johnson et al. |
| 5,090,708 A | 2/1992 | Gerlitz et al. |
| 5,093,718 A | 3/1992 | Hoarty et al. |
| 5,109,414 A | 4/1992 | Harvey et al. |
| 5,109,482 A | 4/1992 | Bohrman |
| 5,132,992 A | 7/1992 | Yurt et al. |
| 5,133,079 A | 7/1992 | Ballantyne et al. |
| 5,157,491 A | 10/1992 | Kassatly |
| 5,174,759 A | 12/1992 | Preston et al. |
| 5,176,520 A | 1/1993 | Hamilton |
| 5,177,604 A | 1/1993 | Martinez |
| 5,181,107 A | 1/1993 | Rhoades |
| 5,189,630 A | 2/1993 | Barstow et al. |

| Patent | Date | Inventor |
|---|---|---|
| 5,210,611 A | 5/1993 | Yee et al. |
| 5,220,420 A | 6/1993 | Hoarty et al. |
| 5,227,874 A | 7/1993 | Von Kohorn |
| 5,231,494 A | 7/1993 | Wachob |
| RE34,340 E | 8/1993 | Freeman |
| 5,236,199 A | 8/1993 | Thompson, Jr. |
| 5,239,463 A | 8/1993 | Blair et al. |
| 5,239,617 A | 8/1993 | Gardner et al. |
| 5,247,347 A | 9/1993 | Litteral et al. |
| 5,261,820 A | 11/1993 | Slye et al. |
| 5,263,723 A | 11/1993 | Pearson et al. |
| 5,291,486 A | 3/1994 | Koyanagi |
| 5,318,450 A | 6/1994 | Carver |
| 5,340,317 A | 8/1994 | Freeman |
| 5,357,276 A | 10/1994 | Banker et al. |
| 5,365,346 A | 11/1994 | Abumi |
| 5,388,197 A | 2/1995 | Rayner |
| 5,404,393 A | 4/1995 | Remillard |
| 5,405,152 A | 4/1995 | Katanics et al. |
| 5,412,416 A | 5/1995 | Nemirofsky |
| 5,438,355 A | 8/1995 | Palmer |
| 5,442,389 A | 8/1995 | Blahut et al. |
| 5,444,499 A | 8/1995 | Saitoh |
| 5,454,722 A | 10/1995 | Holland et al. |
| 5,455,910 A | 10/1995 | Johnson et al. |
| 5,467,288 A | 11/1995 | Fasciano et al. |
| 5,479,268 A | 12/1995 | Young et al. |
| 5,488,411 A | 1/1996 | Lewis et al. |
| 5,526,478 A | 6/1996 | Russell, Jr. et al. |
| 5,532,748 A | 7/1996 | Naimpally |
| 5,534,944 A | 7/1996 | Egawa et al. |
| 5,537,141 A | 7/1996 | Harper et al. |
| 5,541,662 A | 7/1996 | Adams et al. |
| 5,557,724 A | 9/1996 | Sampat et al. |
| 5,570,295 A | 10/1996 | Isenberg et al. |
| 5,585,858 A | 12/1996 | Harper et al. |
| 5,594,492 A | 1/1997 | O'Callaghan et al. |
| 5,594,935 A | 1/1997 | Reber et al. |
| 5,600,363 A | 2/1997 | Anzaki et al. |
| 5,600,364 A | 2/1997 | Hendricks et al. |
| 5,600,366 A | 2/1997 | Schulman |
| 5,600,368 A | 2/1997 | Matthews, III |
| 5,600,573 A | 2/1997 | Hendricks et al. |
| 5,610,661 A | 3/1997 | Bhatt |
| 5,612,900 A | 3/1997 | Azadegan et al. |
| 5,625,693 A | 4/1997 | Rohatgi et al. |
| 5,652,615 A | 7/1997 | Bryant et al. |
| 5,666,293 A * | 9/1997 | Metz et al. .................. 709/220 |
| 5,682,597 A | 10/1997 | Ganek et al. |
| 5,692,214 A | 11/1997 | Levine |
| 5,694,163 A | 12/1997 | Harrison |
| 5,721,827 A | 2/1998 | Logan et al. |
| 5,724,091 A | 3/1998 | Freeman et al. |
| 5,748,731 A | 5/1998 | Shepherd |
| 5,758,257 A | 5/1998 | Herz et al. |
| 5,778,182 A | 7/1998 | Cathey et al. |
| 5,779,549 A | 7/1998 | Jorasch et al. |
| 5,784,055 A | 7/1998 | Ngai |
| 5,786,869 A | 7/1998 | Back et al. |
| 5,790,176 A | 8/1998 | Craig |
| 5,793,365 A | 8/1998 | Tang et al. |
| 5,818,441 A | 10/1998 | Throckmorton |
| 5,825,829 A | 10/1998 | Borazjani et al. |
| 5,828,421 A | 10/1998 | Boyce et al. |
| 5,846,132 A | 12/1998 | Junkin |
| 5,864,823 A | 1/1999 | Levitan |
| 5,884,004 A | 3/1999 | Sato et al. |
| 5,930,493 A | 7/1999 | Ottesen et al. |
| 5,937,329 A | 8/1999 | Helmy et al. |
| 5,951,639 A | 9/1999 | MacInnis et al. |
| 5,956,716 A | 9/1999 | Kenner et al. |
| 5,982,436 A | 11/1999 | Balakrishnan et al. |
| 5,983,069 A | 11/1999 | Cho et al. |
| 6,002,393 A | 12/1999 | Hite et al. |
| 6,005,561 A | 12/1999 | Hawkins et al. |
| 6,008,802 A * | 12/1999 | Iki et al. .................... 345/721 |
| 6,026,376 A | 2/2000 | Kenney |
| 6,029,045 A | 2/2000 | Picco et al. |
| 6,038,000 A | 3/2000 | Hurst, Jr. |
| 6,049,830 A | 4/2000 | Saib et al. |
| 6,064,973 A | 5/2000 | Smith et al. |
| 6,070,149 A | 5/2000 | Tavor et al. |
| 6,075,971 A | 6/2000 | Williams et al. |
| 6,104,443 A | 8/2000 | Adcock et al. |
| 6,141,010 A | 10/2000 | Hoyle |
| 6,181,334 B1 | 1/2001 | Freeman et al. |
| 6,181,711 B1 | 1/2001 | Zhang et al. |
| 6,286,140 B1 | 9/2001 | Ivanyi |
| 6,326,982 B1 | 12/2001 | Wu et al. |
| 6,345,122 B1 | 2/2002 | Yamato et al. |
| 6,373,904 B1 | 4/2002 | Sakamoto |
| 6,418,169 B1 * | 7/2002 | Datari ................... 375/240.28 |
| 6,434,621 B1 | 8/2002 | Pezzillo et al. |
| 6,434,747 B1 | 8/2002 | Khoo et al. |
| 6,487,721 B1 | 11/2002 | Safadi |
| 6,496,980 B1 | 12/2002 | Tillman et al. |
| 6,509,908 B1 | 1/2003 | Croy et al. |
| 6,549,241 B1 | 4/2003 | Hiroi |
| 6,580,462 B1 | 6/2003 | Inoue et al. |
| 6,591,247 B1 | 7/2003 | Stern |
| 6,597,374 B1 | 7/2003 | Baker et al. |
| 6,792,615 B1 | 9/2004 | Rowe et al. |
| 2002/0032905 A1 | 3/2002 | Sherr et al. |
| 2002/0049980 A1 | 4/2002 | Hoang |
| 2002/0053078 A1 | 5/2002 | Holtz et al. |
| 2002/0056091 A1 | 5/2002 | Bala et al. |

FOREIGN PATENT DOCUMENTS

| | | |
|---|---|---|
| CA | 246437 | 1/1925 |
| DE | 44 27 046 | 2/1996 |
| DE | 44 31 438 | 3/1996 |
| EP | 0 016 314 A1 | 10/1980 |
| EP | 0 128 481 A2 | 12/1984 |
| EP | 0 314 572 A2 | 5/1989 |
| EP | 0 489 387 A2 | 12/1991 |
| EP | 0 562 221 A1 | 9/1993 |
| EP | 0847200 A1 | 6/1998 |
| EP | 0 871 337 A2 | 10/1998 |
| EP | 0 879 536 B1 | 11/1998 |
| GB | 2290431 | 12/1995 |
| GB | 2353430 A | 2/2001 |
| JP | 4207885 | 7/1992 |
| JP | 6165170 | 6/1994 |
| JP | 06303543 | 10/1994 |
| JP | 7-46198 | 2/1995 |
| WO | WO 81/02961 | 10/1981 |
| WO | WO-90/00847 A | 1/1990 |
| WO | WO 93/11617 | 6/1993 |
| WO | WO 93/22877 | 11/1993 |
| WO | WO 94/03851 | 2/1994 |
| WO | WO 96/05699 | 2/1996 |
| WO | WO 96/17492 | 6/1996 |
| WO | WO 96/37075 | 11/1996 |
| WO | WO 96/41472 | 12/1996 |
| WO | WO 97/22207 | 6/1997 |
| WO | WO 97/29458 | 8/1997 |
| WO | WO 97/45965 | 12/1997 |
| WO | WO 98/08340 | 2/1998 |
| WO | WO 98/32281 | 7/1998 |
| WO | WO 98/32284 | 7/1998 |
| WO | WO 98/44737 | 10/1998 |
| WO | WO-98-45902 | 10/1998 |
| WO | WO-98-48566 A2 | 10/1998 |
| WO | WO 98/54902 | 12/1998 |
| WO | WO 99/09741 | 2/1999 |

| | | |
|---|---|---|
| WO | WO 99/26415 | 5/1999 |
| WO | WO 99/27713 | 6/1999 |
| WO | WO 99/39506 | 8/1999 |
| WO | WO-99-55066 A1 | 10/1999 |
| WO | WO 00/16544 A | 3/2000 |
| WO | WO 00/43853 | 7/2000 |
| WO | WO 00/51310 | 8/2000 |
| WO | WO 00/64180 | 10/2000 |
| WO | WO 01/24027 | 4/2001 |
| WO | WO 01/28248 | 4/2001 |
| WO | WO 01/47250 | 6/2001 |
| WO | WO 01/50762 | 7/2001 |
| WO | WO 02/31627 | 4/2002 |

OTHER PUBLICATIONS

Advanced Television Systems Committee, "ATSC Digital Television Standard" Revision A, Apr. 6, 2001, pp. 1-65.

Advanced Television Systems Committee, "Advanced Television Systems Committee, Summary of Standards & Activities", Nov. 21, 2000, pp. 1-3.

Advanced Television Systems Committee, "ATSC Data Broadcast Standard", Jul. 26, 2000, pp. 1-88.

Willebeek-Lemair, et al. "On Multi-point Video Control Units for Videoconferencing", 1994, pp. 356-364, IBM T.J. Watson Research Center.

"Overview," located at www.claria.com/companyinfo/ visited on Mar. 1, 2005.

Wittig et al. "Intelligent Media Agents In Interactive Television Systems" IEEE, 1995.

Beaudin, *"The Web is Not TV, Or Is It?,"* http://www.Icc.gatech.edu/gallery/dzine/webtv: copyright 1996; visited on Dec. 11, 2001.

*"Earth Web and ACTV Unveil Hyper TV,"* http://www.3dsite.com/3dsite/cgi/publications/daily-spectrum/issue206.html; visited on May 20, 2002.

Proffit, "Intercast Brings Web to TV," Jan. 21, 1997, PC Magazine, pp. 203-204.

Funkschau, DE, Franzis-Verlag, K.G. Munchen; Verknuepfung Von TV MIT Internet, (Combining TV with the Internet), vol. 16, No. 18; Aug. 16, 1996, pp. 70-71, middle column, p. 71, paragraph 2.

Tsuruta et al., A Knowledge Based Interactive Train Scheduling System Aiming At Large Scale Complex Planning Expert Systems, International Workshop on Artificial Intelligence for Industrial Applications, 1988, pp. 490-495.

Harless, et al., "Interactive Video Disc Case Studies for Medical Education," 10th Annual Symposium on Computer Applications in Medical Care, Oct. 25-26, 1986, pp. 183-187.

Bock, "Videodisk Standards: A Software View of the Technology," SMPTE Journal, vol. 92. No. 5, May 1983, pp. 571-576.

Campbell, "Optimal Decision Making in a Business Simulation, System Sciences," 1989 Annual Hawaii International Conference, vol. III, pp. 822-831.

Dawson, "Compression of the Fast Track," Cablevision, Apr. 22, 1991, pp. 22-30.

Gault, "Turning Cold Box Into Interactive TV," Crain's New York Business, Jul. 15, 1991, p. 17.

Gilder, "Now or Never," Forbes, Oct. 14, 1991, pp. 188-189.

Kim, "First All-Digital HDTV Developed by Video Cipher," Multichannel News, Jun. 11, 1990, p. 35.

Kim, "ATC: Technical Tidal Wave to Engulf Cable Industry," Multichannel News, Aug. 13, 1990, pp. 33-34.

Kim, "Jerrold Offers Cable Digital Compression," Multichannel News, Mar. 11, 1991, p. 6.

Kim, "Test Equipment for Digital Still a Puzzle," Multichannel News, May 27, 1991, p. 24.

Martial et al., "An Interactive Planner for Open Systems," Proceedings of the 4th Conference on Artificial Intelligence, Mar. 1988, pp. 293-298.

Powell, "Digitizing TV Into Obsolescence," New York Times, Oct. 20, 1991.

Waters, et al., "Talking Back to the Tube," Newsweek, Dec. 3, 1990, pp. 56-57.

"Will it Revolutionize HDTV?," Broadcasting & Cable, Jun. 4, 1990, pp. 33-34.

Cable Television Laboratories, "Video Storage in Digital Transmission," Space Technology, vol. 3, No. 7, Sep. 1991, pp. 1-3.

Yu et al., "Design And Analysis Of Look Ahead Scheduling Scheme To Support Pause-Resume For Video-On-Demand Applications," Multimedia Systems, vol. 3, No. 4, Jan. 1995, pp. 137-149.

"Funkschau Fachzeitschrift für elektronische Kommunikation", vol. 6/96 of Mar. 1, 1996., pp. 70-75. and English Translation of extract from Funkschau Fachzeitschrift für elektronische Kommunikation.

Wee et al., "Splicing MPEG Video Streams in the Compressed Domain," IEEE 1997, pp. 225-230.

Hurst et al., "MPEG Splicing: A New Standard for Television-SMPTE 312M," SMPTE Journal, Nov. 1998, pp. 978-988.

"Joining Television and the Internet Using Java", Internet Week, pp. 1-2, Apr. 1, 1996.

Supplementary European Search Report dated Aug. 8, 2005, directed to counterpart foreign application.

* cited by examiner

SYSTEM AND METHOD FOR PROVIDING PRIVATE IN-BAND DATA TO DIGITAL SET-TOP BOXES IN A BROADCAST ENVIRONMENT

FIELD OF THE INVENTION

The invention relates generally to delivering digital information in a broadcast environment. More specifically, one embodiment of the invention relates to delivering digital data by transmission through a broadcast digital television signal in order to update software within a digital set-top box.

BACKGROUND OF THE INVENTION

The convergence of the television and computer realms has been an important recent phenomenon. Although the convergence itself is now apparent, a number of unforeseen problems and opportunities have arisen as television sets have gained access to digital, computer-like resources integrated into the television itself or into an associated set-top box receiver. While some consumers already receive digital television broadcasts over proprietary cable and satellite networks, public wireless broadcasting has traditionally been analog. Public wireless broadcasts of digitized television signals has only recently begun in a very limited fashion in the United States.

Prior to the advent of wireless broadcast digital television, the consuming public primarily relied on analog television broadcast over spectrum allotted by the Federal Communications Commission (FCC) and transmitted in a manner defined under the National Television Standards Committee (NTSC) standard. NTSC television channels occupy 6 Megahertz slots in the electromagnetic spectrum and are defined in such a way as to control analog television sets in a raster scan method. The general nature of analog television signal broadcast and reception has not changed for decades, thus, for example, a well-made twenty year old television set may still receive and display signals as easily as it did when it was new.

Digital television broadcast and reception offers new challenges and opportunities. For example, multiple digitized television signals can now occupy a single 6 Megahertz slot, where only one analog channel previously existed. One way in which this has been done is to convert analog video signals into digital format for transmission. Straight analog-to-digital conversion of video signals results in very large amounts of digital data because video signals contain a large amount of information. For example, a single frame of digitized NTSC video may represent over 350 Kbytes of data. Since there are 30 frames/sec in standard videos, two hours of video, including the much smaller audio portion, is roughly equivalent to about 80 Gbytes. The data transfer rate would need to be 22 Mbytes/sec.

In order to reduce the data transfer requirements, digital video signals are oftentimes compressed before transmission and decompressed after reception by the set-top box or other digital broadcast receivers. The video signals may be compressed and decompressed by a variety of algorithms, including those defined in the Joint Photographic Experts Group (JPEG), Motion Pictures Expert Group (MPEG) 1, MPEG 2 and MPEG 4 standards.

The standards for compression and decompression continue to change. As new standards arrive, digital broadcast receivers designed under previous standards may not be compatible or may not be able to take full advantage of the capabilities available under a new standard. Many of the millions of set-top boxes that will soon be operating in the homes of millions of consumers may have all the necessary hardware and connections in place to operate under a new standard if they were provided with new software, but there is no convenient way to deliver the updated software to those set-top boxes. Methods such as transporting the set-top boxes to an authorized dealer are inconvenient, prohibitively expensive, and take too much time from many users' perspectives and therefore will fail to reach a large percentage of viewers. Furthermore, many users will have different set-top boxes or television receivers made with different software at different times by different manufacturers, which should all be updated as standards change.

Digital set-top boxes do not typically have an out-of-band channel that provides a mechanism to directly address and communicate with the set-top box. Implementing an out-of-band channel requires a land line, radio frequency modem, or the like, to connect to a private network server or an Internet server to receive updates as well as software to drive such a connection, all of which adds cost and complexity to the set-top box.

Although some of the problems with digital transmission have been described, there are opportunities as well. For example, ACTV, Inc. has described in various pending and issued patents the combination of broadcast television and Internet communications to improve the overall viewing experience and enable more focused advertising. As these and other applications are implemented, older set-top boxes may not have the software necessary to support this increased functionality.

What is needed is a way to remotely update digital set-top boxes in a public broadcast environment. What is also needed is a way to remotely update digital set-top boxes in a proprietary environment because digital set-top boxes in a proprietary environment, such as digital cable or direct broadcast satellite television, have many of the same issues as those in the public broadcast environment and require updated software for a variety of different set-top boxes.

SUMMARY OF THE INVENTION

In one embodiment, the invention provides update software to digital set-top boxes in a public digital broadcast environment. In another embodiment, the invention provides update replacement software to digital set-top boxes in a proprietary digital broadcast environment such as the digital cable and digital satellite broadcast environments. For convenience, the term "set-top box" will be taken to include all forms of digital broadcast receivers. In one example, the update software contains new operating instructions for the digital set-top box to be incorporated in the set-top box for execution. In another example, the update software allows the set-top box incorporating it to correct previous problems with prior software, add additional features or enhancements, comply with a different standard or merely replace the prior software. In yet another example, the update software includes profile data to target advertising to a particular set-top box. For convenience, the term "update software" will be taken to include any digital data transmitted to a set-top box using aspects of the invention.

Unlike a proprietary digital broadcast environment, in a public broadcast environment viewers may purchase and utilize any equipment they choose. In the public digital broadcast environment, update software is inserted into the transmission stream for receipt by the set-top boxes. The update software includes a set of one or more manufacturer codes corresponding to each type of set-top box made that the update software is intended to be incorporated in. When appropriate, the update software may also include a separate set of instructions to determine the environment in which the set-top box is in, for example, the instructions may determine whether or not an Internet connection is available to the set-top box and suggest to the user that additional features are available if such a connection were to be provided. Different versions of the update software can be transmitted to ensure that all previously manufactured and sold set-top boxes are updated.

The transmission of update software can occur in a variety of ways, for example, in one embodiment, a low-bandwidth channel is carved out of one 6 Megahertz NTSC channel. The set-top box will, as previously instructed, set its tuner to that channel at specific times to see if update software is available. For example, when the set-top box is turned off, or periodically at a time when viewing is low, such as once a month at 3:00 A.M. on a Wednesday morning, the set-top box can be programmed to tune to a specific station to look for update software having its manufacturer ID. If a match is made, then the update software can be stored in the set-top box memory and executed in order to download the software into the set-top box. The set-top box can be programmed to allow a viewer to stop the updating at any time so that the box will always be available to the viewer, but warning the viewer that the set-top box's software will not be updated.

Unlike the proprietary digital broadcast environment where the owner of the proprietary network controls which set-top boxes are used and the manner in which update software is delivered, in the public digital broadcast environment, individual holders of the FCC licenses for the spectrum involved control the corresponding channels. For convenience, the term "broadcaster" will be used to refer to any person or entity that controls proprietary or public spectrum or otherwise has an opportunity or capability to broadcast update software. It is envisioned that broadcasters will lease their spectrum for broadcast of update software at mutually agreeable times and terms. Thus, the invention provides both a vehicle for providing update software to digital set-top boxes and a way for broadcasters to sell otherwise underutilized or unused broadcast times. To their mutual advantage, both the broadcasters and those seeking to provide update software benefit by seeking times when the set-top boxes are least used by the viewers that control them.

In another embodiment more applicable to the proprietary digital broadcast environment, the entity controlling the broadcasts can choose the most appropriate time to update the set-top boxes.

Other uses and features of the invention will be more readily appreciated by reference to the following detailed description in connection with the accompanying drawings.

BRIEF DESCRIPTION OF THE DRAWING FIGURES

The detailed description will refer to the following drawings, wherein like numerals refer to like elements, and wherein.

DETAILED DESCRIPTION OF THE INVENTION

Figure 1:
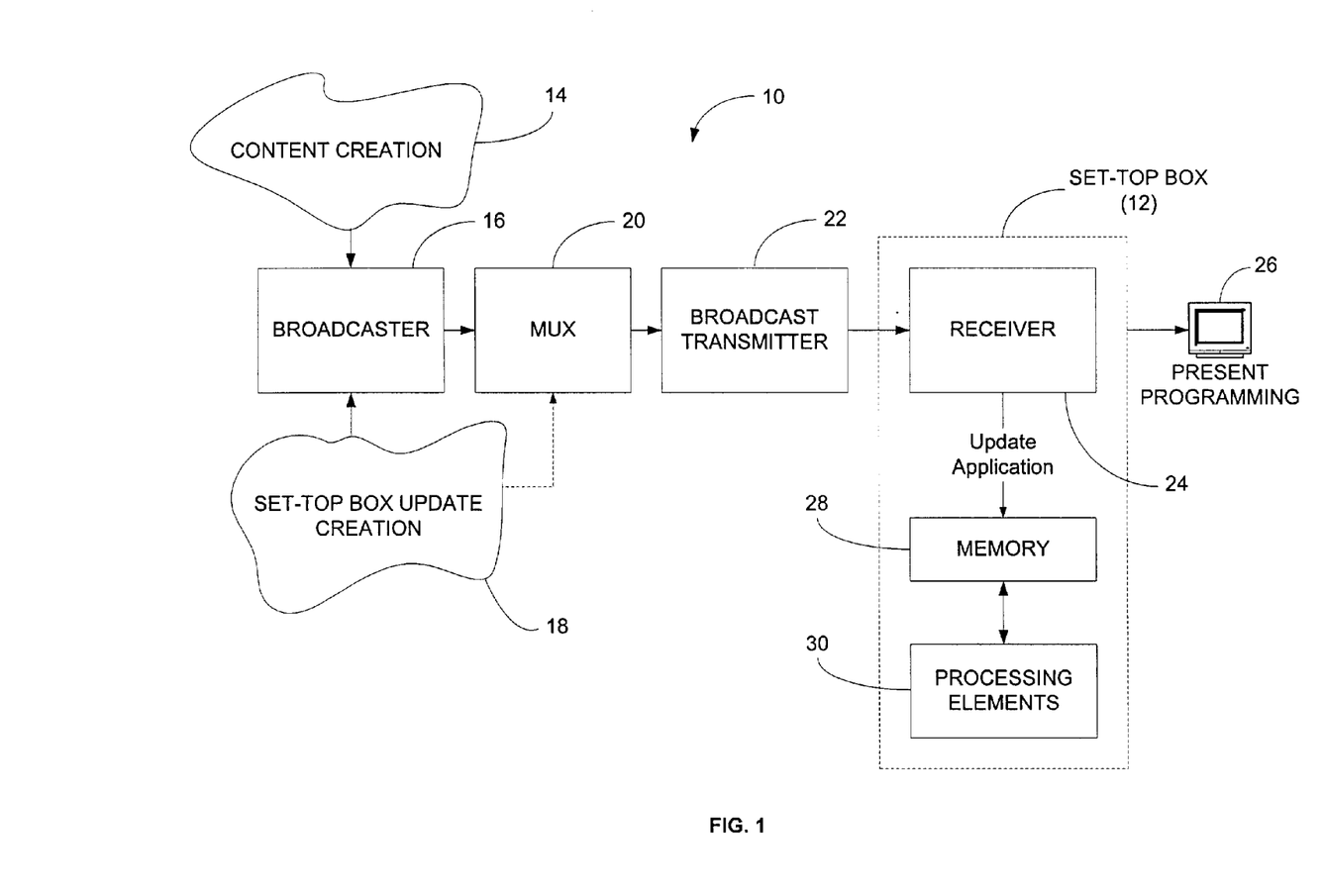
FIG. 1 is a block diagram of a digital data broadcasting system and a set-top box receiver according to one embodiment of the invention.

FIG. 1 is a block diagram of a digital data broadcasting system 10 and a set-top box receiver 12 according to one embodiment of the invention. The invention is not limited to any particular type of digital transmission environment and may be deployed in a great variety of different digital environments where digital information is used including wired, wireless, public, proprietary and networked environments. In the digital data broadcasting system, content 14, such as digital video data and digital audio data, is created and provided to an originator or broadcaster 16. Update software 18 is also created and provided to the broadcaster 16. The originator 16 sends the digital video data 14, the digital audio data 14, and the update software 18 to a multiplexor 20, where it is packetized and multiplexed onto a transport stream in accordance with, for example, the MPEG 2 standard.

The digital video data 14, digital audio data 14, and the update software 18 are then transmitted by a broadcast transmitter 22 to the set-top box receiver 12. The update software may be introduced independently of any video and audio data into the transport stream, and may be introduced at the multiplexor 20, at the transmitter 22, or at other components of the broadcast transmission system 10 not illustrated in FIG. 1. One of ordinary skill in the art will recognize that FIG. 1 is a generalized block diagram of a broadcast system, and for purposes of clarity and to not obscure the invention, many elements of a broadcast system are not shown such as satellite uplinks, cable head ends, and the like.

The set-top box 12 includes a receiver 29, which is set to the appropriate channel to receive the content 14 or the update software 18. Content is displayed on a screen 26 and played over speakers associated with the set-top box as is known in the art. The update software is stored in a memory 28 of the set-top box and uploaded to the appropriate set-top box processing elements 30 as provided for in the update.

Packetization of the update software involves creating update software packets including a header and a payload. Generally, the header contains various control information and the payload contains the data for the set-top box. The payload includes update software, such as executable code, and other manufacture private data intended for incorporation and use by the set-top box.

In one embodiment of the invention, the packet header identifies the packet as containing update software, and identifies one or more types of set-top boxes that should receive the update software. In one example, the header includes a unique table identifier (table ID), a unique manufacture identifier (manufacture ID), a product code (product ID), an application identification (application ID), and a data length. The table ID is a marker to indicate that the information in the packet, i.e., the payload, contains manufacture private data update software. The manufacturer ID is a code identifying a particular type of set-top box that should receive the update software. The product code is a code used to identify a particular product, e.g., a particular type or model of set-top box produced by a manufacturer. The application ID is an update identification code used to identify a particular application on a set-top box that the update software is intended to update. Finally, the data length identifies how many bytes of information are in the payload. Alternatively, some of the information in the header, such as the application ID, can be a part of the payload.

The Advanced Televisions Systems Committee (ATSC) has defined a structure for bit syntax of tables used in the Program and Systems Information Protocol (PSIP) standard. One example of a packet according to the invention conforming to the PSIP standard is formatted as shown in the following Table 1.

TABLE 1

Bit Syntax of Packet according to one embodiment of the invention.

| Syntax | Bits | Format |
|---|---|---|
| manufacturer_private download_section ( ) { | | |
| table_id | 8 | 0xCE |
| section_syntax_indicator | 1 | '1' |
| private indicator | 1 | '1' |
| zero | 2 | '00' |
| section length | 12 | uimsbf |
| table_id_extension | 16 | 0x0000 |
| reserved | 2 | '11' |
| version number | 5 | uimsbf |
| current_next_indicator | 1 | '1' |
| section number | 8 | uimsbf |
| last_section_number | 8 | uimsbf |
| protocol version | 8 | uimsbf |
| manufacturer id | 32 | uimsbf |
| product code | 16 | uimsbf |
| application id | 16 | uimsbf |
| data length | 32 | uimsbf |
| for (i=0; i<data length; i++) { | | |
| manufactures_private_data | 8 | uimsbf |
| } | | |
| CRC 32 | | |
| } | | |

The following Table 2 provides a general definition of the packet syntax illustrated in Table 1.

TABLE 2

Syntax definition for Packet illustrated in Table 1 according to one embodiment of the invention.

| table_id | An 8 bit unsigned integer number that indicates the type of table section being defined. One of the reserved ATSC values of 0xCE is selected. |
|---|---|
| section_syntax_indicator | Set to 1. |
| private_indicator | Set to 1. |
| section_length | Specifies the number of bytes in the section. |
| table_id_extension | Unused. |
| version_number | Incremented whenever the current_next_indicator toggles. |
| current_next_indicator | A one bit field used to indicate if a new table is being sent. |
| section_number | These tables may be composed of multiple sections. This is an indication of which section of the table this is. |
| last_section_number | These tables may be composed of multiple sections. This is an indication of which section is the last section of the table. |
| protocol_version | Used for upward compatibility when the protocol is changed in the future. |
| CRC_32 | Used to check the validity of the packet. |
| manufacturer_id | A unique identifier assigned to any manufacturer of equipment that might receive ATSC broadcast messages. |
| product_code | A code distinguishing between the various products in the product line of the manufacturer. In one example, the manufacturer defines the exact meaning of these bits. |
| application_id | A code used to distinguish between the various software applications that may be running in the set-top box. In one example, the manufacturer defines the exact meaning of these bits. |
| data_length | The number of bytes comprising the manufacturers_private_data that follows. |
| manufacturers_private_data | The bytes of data making up the payload and the update software. In one example, the manufacturers_private data may be defined by the manufacturers in any way they choose. One possible form of manufacturers_private_data or update software is a download of new executable code for the set-top box. |

In one example, the update software 18 includes profile data which is a type of control data for use in a set-top box 12 that supports targeted advertising. The profile data allows a set-top box targeted advertising application to select a targeted set of advertisements intended for specific set-top boxes. In this case, the application_ID would be set to a value unique to the targeted advertising application. This would tell the set-top box that this table is of interest to the targeted advertising application, and send the table to the targeted advertising application for processing.

A sample format for update software including a profile download is as shown in the following Table 3.

TABLE 3

Format for Profile Download

| Syntax | Bits | Format |
|---|---|---|
| manufacturers_private_data( ) { | | |
| data_type | 16 | uimsbf |
| number_of_box_ids | 32 | uimsbf |
| for (i=0; i<number_of box ids; i++) { | | |
| set-top box_id | 64 | uimsbf |
| profile_start_address | 32 | uimsbf |
| number of profile_bytes | 32 | uimsbf |
| for (i=0; i<number of profile_bytes; i++) { | | |
| profile bytes | 8 | uimsbf |
| } | | |

TABLE 4

Syntax definition for profile download
according to one embodiment of the invention.

| | |
|---|---|
| data_type | Also referred to as packet subtype. This field is provided to support multiple types of data to the set-top box. For example, a value of 1 = software upgrade, and a value of 2 = profile update. In the example of a profile update, the value would be set to 2 to indicate this is a profile update, and cause the remaining bits in the table to take on the following meaning: |
| number_of_box_ids | This is the total number of set-top box identifiers in the profile list. |
| set-top box_id | A unique identification assigned to each set-top box. This allows the profile data to be sent to a subset of boxes with the same manufacturer id and product code. |
| profile_start_address | This is the starting address of the set-top box profile space where the profile data is to be loaded. |
| number_of_profile_bytes | The number of bytes of profile data for the set-top box. |
| profile_bytes | The bytes of profile data being delivered to the set-top box. This allows the profile space to be divided up in any number of ways and delivered in pieces or as a whole. |

The set-top box 12 recognizes that profile data is present by checking the data_type update identification field, which, in one example, is set to 1 for an application or software upgrade, and is set to 2 for profile data. In the case of profile updates, the profile manufacture private data is only uploaded to particular set-top boxes associated with users with the profile. In one example, a set-top box identifier (set-top box_id) is provided in the header. The set-top box_id is a unique identifier for each set-top box. The profile update also includes a profile_start_address corresponding with the starting address of the memory location in the set-top box for storing the profile data, and a number_of_profile_bytes field indicating the number of bytes of profile data being sent to the set-top box, which indicates the number of memory locations following the profile_start_address in which to store the profile data.

The payload may include update software, such as executable code or profile data, and other manufacture private data intended for incorporation and use by the set-top box 12. In other examples, the payload can include fields for packet subtype and sizes, control information to permit large amounts of data to span multiple packets, or any other data the manufacture finds useful. The payload data may be encrypted to reduce the likelihood of tampering with the payload data and the set-top box.

Figure 2:
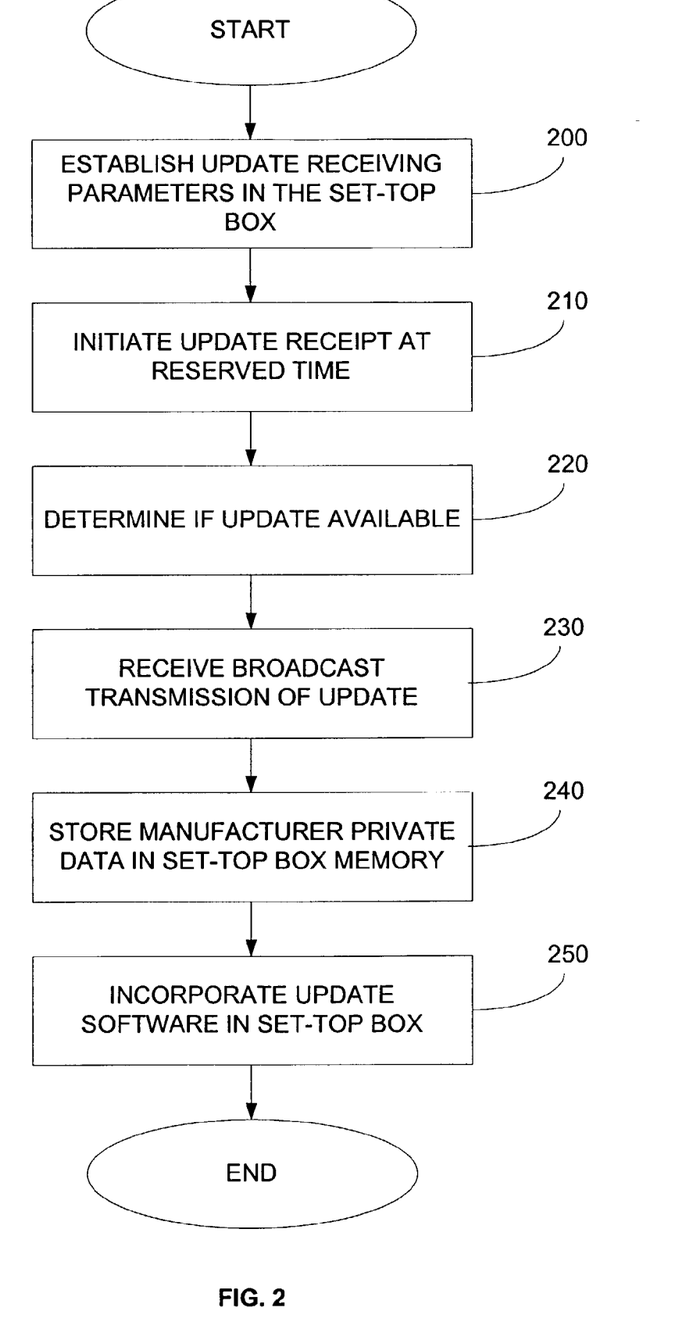
FIG. 2 is a flowchart illustrating a method for receiving update software in a set-top box according to one embodiment of the invention.

FIG. 2 is a flowchart illustrating a method for receiving update software in a set-top according to one embodiment of the invention. First, one or more update receiving parameters are established in the set-top box (operation 206). In one example, the update receiving parameters include an update receiving time and an update receiving channel. The update software 18 is typically transmitted to the set-top box at the established time and on the established channel.

Figure 3:
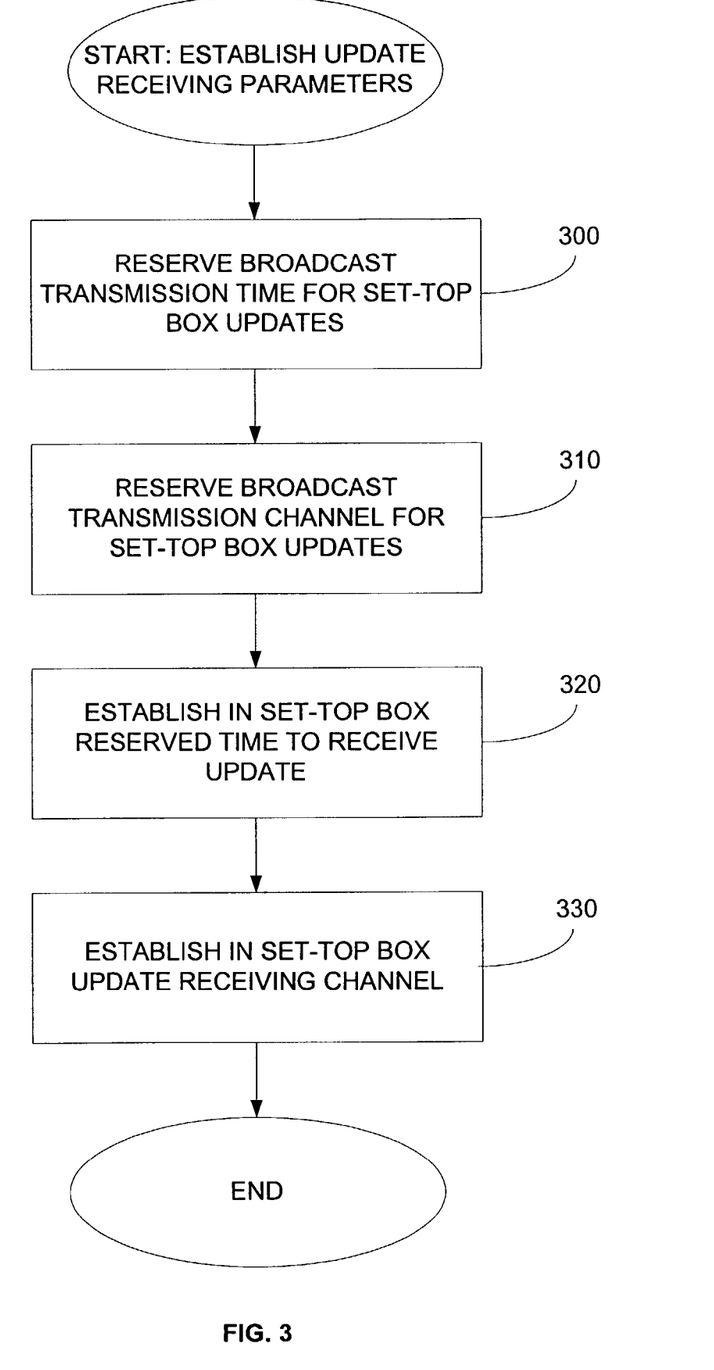
FIG. 3 is a flowchart illustrating a method for establishing update receiving parameters in a set-top box according to one embodiment of the invention.

FIG. 3 is a flowchart illustrating a method for establishing update receiving parameters in a set-top box of operation 200 of FIG. 2 according to one embodiment of the invention. In one example, the set-top box manufacturer, update software creator, or other developer of the update software reserves, schedules, or otherwise establishes a broadcast transmission time with a broadcaster 16 to broadcast the set-top box update (operation 300). For convenience, the term "developer" will be taken to include any person or entity that creates, develops, codes, provides, or supplies update software. In addition to the broadcast time, the developer of the update software reserves, schedules, or otherwise establishes a broadcast transmission channel with a broadcaster 16 for sending the update software to the set-top box (operation 310).

After a broadcast time and channel are reserved, the reserved broadcast time and channel are established in the set-top box 12 (operations 320 and 330). In one example, the broadcast time and channel are programmed in the set-top box 12 at the manufacturer prior to shipment of the set-top box. In another example, the update time and channel may be set by way of one or more dip switches on the set-top box 12 at any point in the distribution chain of the set-top box including at the user location by the user or others.

Alternatively, the broadcast time and channel may be broadcast to the set-top at predetermined or default time and on a predetermined or default channel. The default time and channel are programmed at the manufacturer. In-band transmission of the reserved update broadcast time and channel requires transmission of very little data. Accordingly, regardless of when the default time is set and what default channel is set, the transmission of content to the set-top box 12 will have minimal impact on viewing other programming. For example, if the default broadcast time and channel happen to be used by a particular broadcaster 16 to transmit content 14 to the set-top box 12, the transmission of the reserved time and channel information/data to the set-top box at the default time and channel would likely not even be noticed by a viewer. The default time and channel may also be used for broadcasting the update in the event the default time and channel are not otherwise being used by the broadcaster to broadcast content to the set-top box.

Typically, the developer will establish seldom used broadcast channels and times for transmission of update software 18 to reduce the impact of an update transmission on viewing of other content. For example, the developer may reserve a time of 3:00 A.M., when the set-top box receipt of other content is likely very low because most people are sleeping. Thus, in many cases, the update software 18 can be received by the set-top box 12 without any disruption of viewing of other content. In addition, the developer will typically reserve a channel that is otherwise unused to reduce the cost of transmitting the update and reduce the impact of transmitting the update on other broadcast content. Seldom used broadcast times and channels are likely to be available for use by a developer for broadcasting update software at a lesser cost than other channels and times. This is also advantageous for the broadcaster 16 as they may derive revenue from otherwise unused or underused broadcast channels and times.

Referring again to FIG. 2, after the reserved update time and channel are established in the set-top box 12, the set-top box initiates the receipt of update software at the reserved time and on the reserved channel (operation 210). In one example, the set-top box 12 may include executable instructions in its operating software that initiate receipt of an update at the established time based on a clock signal. The clock signal may be internal to the set-top box, or updated periodically through receipt of a broadcast clock signal transmission. Most set-top boxes maintain an internal time of day clock. The date and time is usually set by information broadcast over the network.

Figure 4:
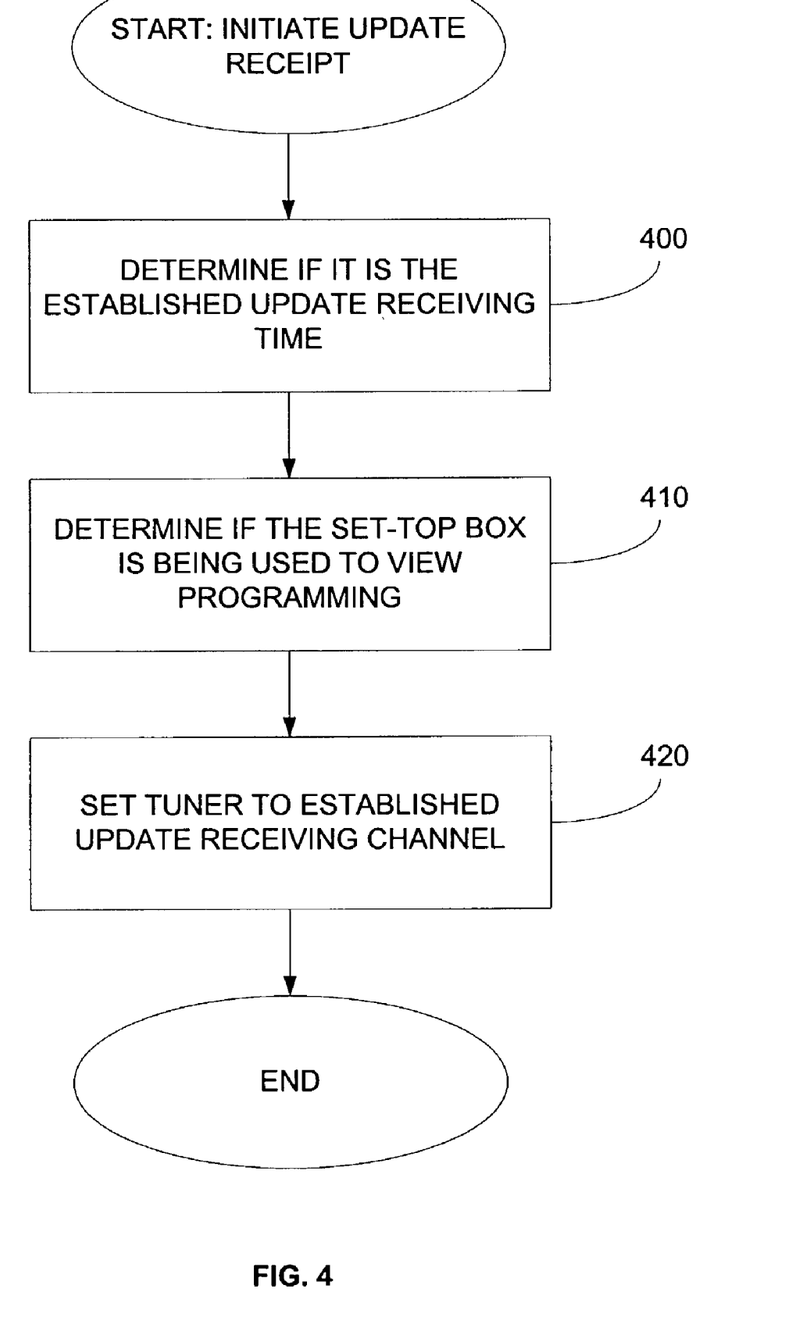
FIG. 4 is a flowchart illustrating a method for initiating receipt of update software in a set-top box according to one embodiment of the invention.

FIG. 4 is a flowchart illustrating a method for initiating receipt of update software in a set-top box of operation 210 of FIG. 2 according to one embodiment of the invention.

First, the set-top box 12 monitors the current time and determines if it is the established update receiving time (operation 400). At the established time, the set-top box determines if the set-top box is receiving other content on a channel besides the update channel (operation 410). For example, a user may be using the set-top box to view content being received on a different channel. To minimize the possibility that the set-top box 12 is being used to view other content at the reserved update time, the update receiving time is typically chosen for a time when other use of the set-top box has a low likelihood. If the set-top box 12 is not being used to view other content, then the set-top box tuner 24 is set to the established update receiving channel (operation 420). Accordingly, the set-top box is ready to receive in-band update software on the reserved channel.

In one example, the tuner 24 is automatically set to the update channel without any user intervention at the update receiving time. In another example, the viewer will be prompted to set the tuner to the update channel. For example, a message, such as "To receive update software for your set-top box, please turn to channel 100," is displayed prompting user action. By tuning to channel 100, the set-top box will know to continue processing the receipt of update software.

In the event that the set-top box is being used to view other content, the set-top box 12 may generate a request giving the viewer the option to receive the update software. For example, a message on the screen, such as "update software for your set-top box is now available for automatic download, please select YES if you would like to receive the download now or NO if you would prefer to receive the download at a later time," is displayed. The viewer thereby has the option of receiving update software even when they are viewing other content.

Referring again to FIG. 2, after initiation of the set-top box for receipt of update software, the set-top box determines if update software is available on the reserved channel (operation 220). Numerous different schemes are possible for broadcasting updates to the myriad of different set-top boxes. During any given month a particular broadcaster may schedule update transmissions for different manufactures at a particular time and on a particular channel. Updates for different manufactures may be broadcast on a day-by-day schedule. For example, update software from manufacture A may be broadcast on the first Monday of each month at 3:00 A.M. on channel 111, and update software from manufacture B may be broadcast on the first Tuesday of each month at 3:00 A.M. on channel 111, etc. In another example, updates from manufacturer A, B, C, etc, may all be broadcast on each Monday at 3:00 A.M., on channels 111, 112, 113, etc. In many instances, a manufacturer or developer will not have an update for broadcasting so when the set-top box tunes to the update receiving channel, no update will be available. Broadcast updates may also be scheduled and transmitted only when a developer has an update and reserves an update channel and time.

Figure 5:
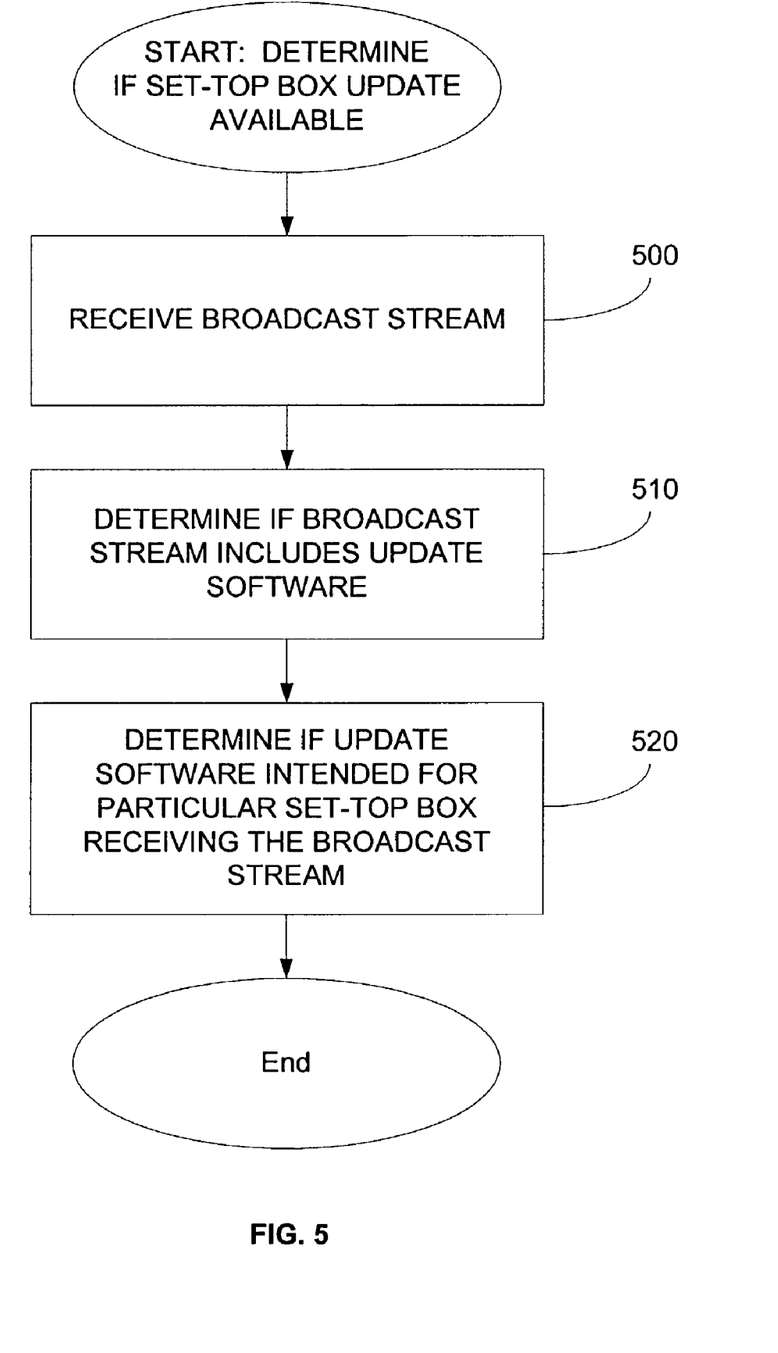
FIG. 5 is a flowchart illustrating a method for determining if update software is available for receipt according to one embodiment of the invention.

FIG. 5 is a flowchart illustrating a method for determining if update software is available for receipt in fulfillment of operation 220 of FIG. 2. After tuning to the reserved channel, the set-top box receives whatever broadcast stream is available on the reserved channel, if any (operation 500). If a broadcast stream is present, the set-top box 12 determines if update software is present in the broadcast stream (operation 510). As discussed above, in one embodiment of the invention, update data packets being received on the reserved channel include a packet header with a table ID and manufacturer ID. In one example, the set-top box 12 analyzes the packet header to determine if the table ID indicates update software is present. The table ID provides a means for the set-top box software or hardware to filter PSIP tables of a particular type and ignore others. The table ID prevents tables containing one type of information (guide data, for example) from being confused with tables containing other types of information, such as the manufacturer_private_data.

Next, the set-top box determines whether the update software is intended for the particular set-top box 12 receiving the broadcast stream (operation 520). In one example, the set-top box analyzes the packet headers in the received broadcast stream and extracts the manufacture ID to determine if the update software being broadcast on the update channel is for the particular set-top box receiving the broadcast stream. A stream of dummy packets may first be broadcast on the update channel with packet headers having unique table ID and manufacture ID information, but having no update software, in one example. The dummy packets will be transmitted for some time period before beginning to broadcast update data packets with update software in the payload to allow the set-top box to extract the manufacture ID and determine if the manufacture ID matches the set-top box manufacturer. Besides the manufacturer ID, the set-top box 12 may also check the product code ID to determine if the update software is intended for the particular model of set-top-box.

Alternatively, the broadcast data may be transmitted with update software in the payload and synchronizing data may also be transmitted along with the packets so that the set-top box can extract the manufacturer private data (e.g., update software) from the packets and reassemble the received manufacturer private data. In another alternative, the update software may be broadcast more than one time so that in the event that the set-top box does not receive all of the update software on the first try, it will have one or more additional opportunities to receive update software.

Referring again to FIG. 2, if the update software is intended for the set-top box 12, then the set-top box will continue receiving the update software being broadcast on the reserved channel (operation 230) and store it in set-top box memory (operation 240). In one example, the set-top box 12 uses the application ID or the profile start address in conjunction with the data_length to determine where to store the update software. After the update software is received and stored, the update software is incorporated in the set-top box (operation 250).

Figure 6:
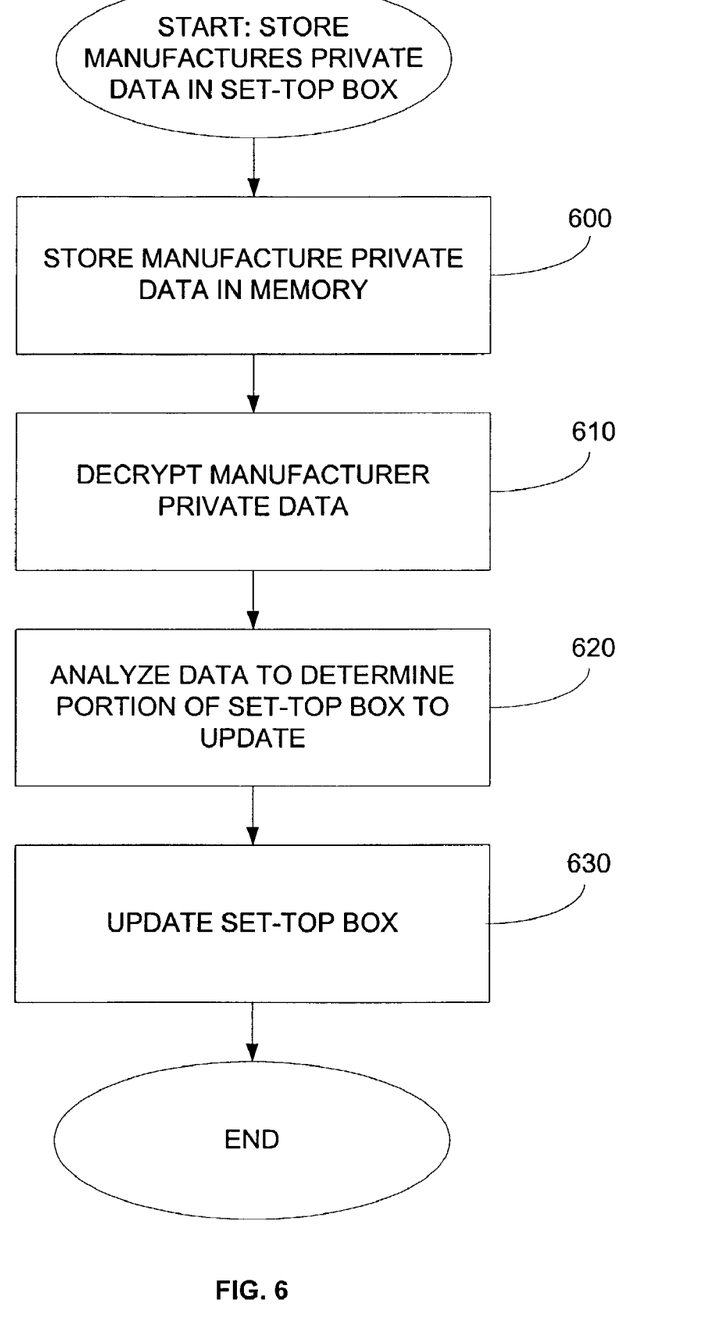
FIG. 6 is a flowchart illustrating a method for storing received update software in a set-top box according to one embodiment of the invention.

FIG. 6 is a flowchart illustrating a method for storing received update software in a set-top box (FIG. 2, operation 240) and incorporating the update software in the set-top box (FIG. 2, operation 250) according to one embodiment of the invention. First, upon receipt of the update data, it is stored in the set-top box memory 28 (operation 600) corresponding with the application ID or the profile start address. Oftentimes, the manufacturer will desire to encrypt the update software. Encryption, in some instances, reduces the bandwidth needed to broadcast the update and, in some instances, can also reduce the likelihood that third parties can determine the contents of the manufacturer's private data, e.g., the update software. The received update software is accordingly decrypted after it is received by the set-top box (operation 610). The decryption can occur as the update software is being stored or afterwards.

After decryption, the update software is analyzed to determine the portion of the set-top box 12 that the update software is intended to update (operation 620). For example, the update software may be intended to update the set-top box operating system, to update a particular software module, or add entirely new functionality to the set-top box. The application ID identifies what code to replace, what portions of the code to update, and the like. In the case of profile data, the profile start address and the data length determine which portion of memory to replace. Alternatively, the update software will include a software routine to update the set-top box. Once the update software is decrypted, the update routine will execute and thereby update the set-top box with the update software (operation 630).

Figure 7:
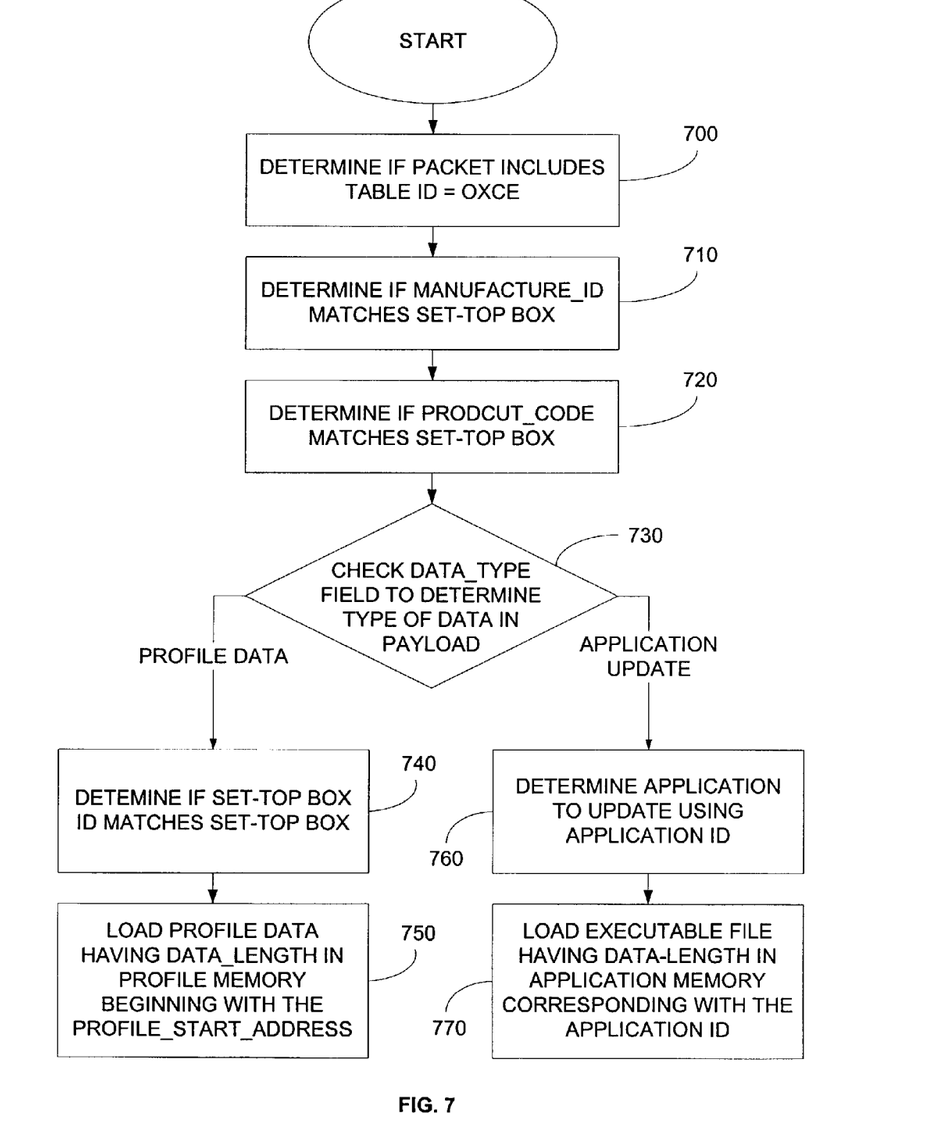
FIG. 7 is a flowchart illustrating a method for updating a set-top box according to one embodiment of the invention.

FIG. 7 illustrates a flowchart of one particular method of updating a set-top box (FIG. 6, operation 630) according to the invention. Using the packet illustrated in Tables 1 and 3 as an example, any set-top box programmed to take advantage of the update mechanism of the invention will look for tables with a table_id of 0xCE (operation 700). Filtering for tables with a specific table_id may be provided in system hardware or in software. When packets with the table_id arrive, the set-top box 12 then would examine the rest of the table to see if the manufacturers_id matches that of the set-top box (operation 710). If the match occurs, the product_code is checked to be sure the information in the packet is pertinent to the specific model and revision of the set-top box (operation 720). If all the above criteria match, the data_type field is examined (operation 730). If the table is found to contain profile data, the number_of_box_ids field is used in conjunction with the number_of_profile_bytes field to search through the remainder of the packet for a matching set-top box_id (operation 740). A match on this field indicates the profile is destined for this particular set-top box, and so the profile_bytes are loaded into the profile memory starting at the profile_start_address and continuing for the number_of_profile_bytes (operation 750). If an application update is received, the set-top box determines which application to update using the application_ID (operation 760). The executable file is then loaded in the appropriate memory location (operation 770).

Figure 8:
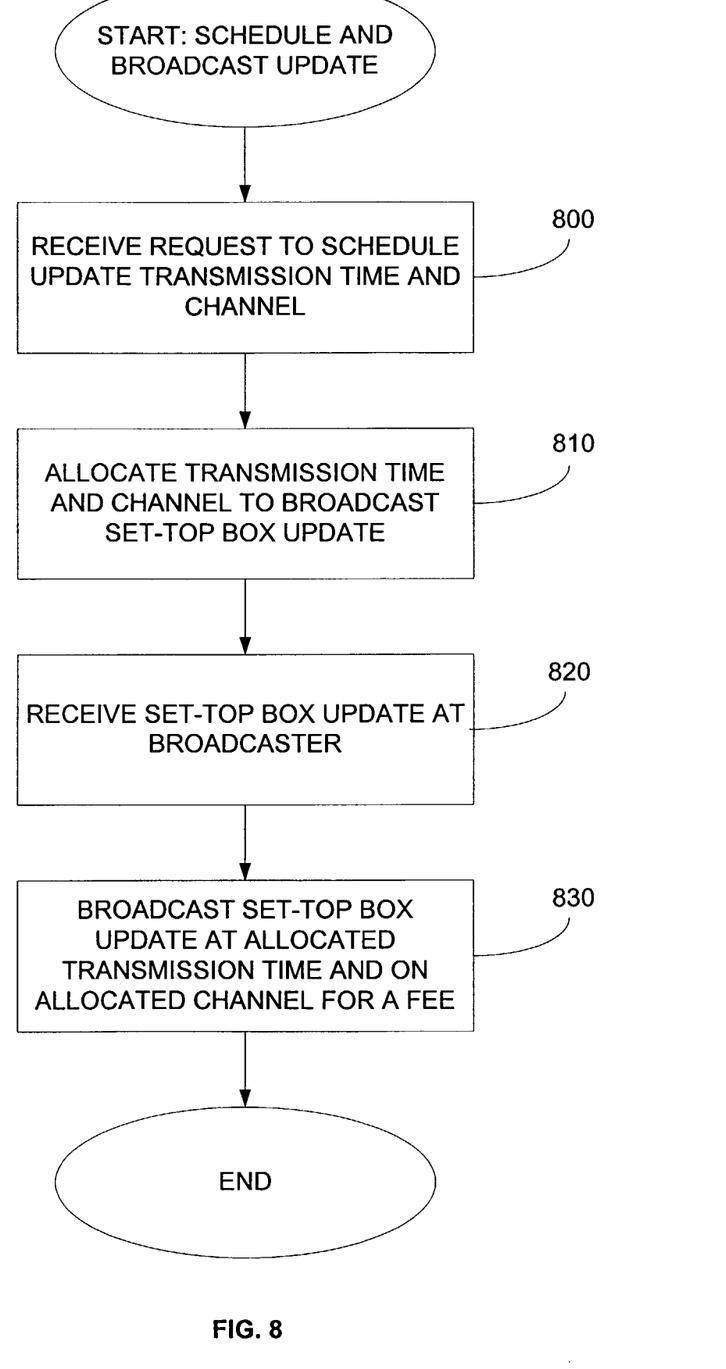
FIG. 8 is a flowchart illustrating a method for establishing update data at a broadcaster and broadcasting the update to one or more set-top boxes according to one embodiment of the invention.

FIG. 8 illustrates a flowchart of one method for a broadcaster or other to utilize aspects of the present invention to obtain revenue for broadcast channels and broadcast time that are otherwise underutilized or not utilized at all. Very early morning broadcasting, e.g., 3:00 A.M., does not generate nearly as much revenue, if any, from advertising as other time slots. In many instances, broadcasting is ended for some period of time on various channels in the very early morning hours. In addition, broadcasters oftentimes do not have enough content to broadcast on all of the available channels, and therefore channels go unused. Broadcasters can allocate unused channels, reallocate very early morning time slots, or otherwise allocate broadcast times and channels to broadcasting update software for a fee.

The broadcaster 16 receives a request from a developer to schedule an update transmission time and channel (operation 800). As discussed above, the update time and channel may be pre-allocated by the broadcaster, scheduled on an ad hoc first-come first-serve basis depending on channel and time slot availability, or otherwise allocated as best suits the needs of a particular broadcaster 16. Nonetheless, an update software channel and time are allocated by the broadcaster (operation 810). The broadcaster will receive the update software from the developer (operation 820) and broadcast it at the allocated time and on the allocated channel (operation 830). In return for broadcasting the update software, the broadcaster may charge a fee. The fee may be a function of the size of the update software, a function of a flat rate fee schedule, a function of the time and channel allocated, or otherwise depend on particular arrangements between a broadcaster and a developer.

In the above detailed description, the invention is described in detail with reference to various embodiments thereof, with some aspects of the invention being described in the accompanying drawings. Numerous specific details are set forth in order to provide a thorough understanding of the invention. However, it will be apparent to those skilled in the art that the invention may be practiced without some or all of the specific details, that operations may be rearranged, that some operations may be eliminated or performed in a different way, and that other changes may be made without departing from the spirit and scope of the invention as defined in the following claims.

What is claimed is:

1. A method for receiving user profile update data for selecting a targeted advertisement or application update data at a broadcast receiver having at least one data receiving parameter comprising:

designating a channel to receive a broadcast transmission;

receiving the broadcast transmission including at least one broadcast receiver identifier, a data type parameter, and the user profile update data or application update data;

selecting the channel containing the broadcast transmission at a predetermined time or during a predetermined period for receiving the update data;

extracting the update data from the channel;

determining if the extracted data is profile update data or application update data based on the data type parameter in the update data;

determining whether the at least one broadcast receiver identifier is associated with the at least one data receiving parameter of the broadcast receiver; and storing the update data in the broadcast receiver based on the at least one broadcast receiver identifier and the data type parameter.

2. The method of claim 1 wherein the broadcast transmission comprises at least one data packet including the at least one digital broadcast receiver identifier and the update data.

3. The method of claim 1 wherein the at least one broadcast receiver identifier comprises a table identification to identify the data packet as including the update data.

4. The method of claim 1 wherein the at least one broadcast receiver identifier comprises a manufacturer identification.

5. The method of claim 1 wherein the at least one broadcast receiver identifier comprises a product identification.

6. The method of claim 1 wherein the at least one broadcast receiver identifier comprises a broadcast receiver identification.

7. The method of claim 1, further comprising:

identifying whether the digital broadcast receiver is intended to receive the update data.

8. The method of claim 1 wherein the broadcast transmission comprises at least one update identifier.

9. The method of claim 8 wherein the at least one update identifier comprises an application identifier.

10. The method of claim 8 wherein the at least one update identifier comprises a data type identifier.

11. The method of claim 8, further comprising:

identifying a processing element of the digital broadcast receiver to update with the update data.

12. The method of claim 1 wherein the data comprises code.

13. A computer readable medium containing instructions which, when executed, perform the method of claim 1.

14. A method for receiving user profile update data for selecting a targeted advertisement or application update data at a broadcast receiver having at least one memory location comprising:
  providing for establishing at least one data receiving parameter in the broadcast receiver;
  designating a channel to receive a broadcast transmission;
  selecting the channel containing the broadcast transmission at a predetermined time or during a predetermined period for receiving the user profile update data or application update data;
  extracting the update data from the channel;
  determining if the extracted data is profile update data or application update data based on a data type parameter in the update data;
  if the data type is profile data:
    initiating data receipt as a function of the at least one data receiving parameter;
    determining if the update data is intended for the broadcast receiver; and
    storing the update data in the at least one memory location of the broadcast receiver;
  if the data type is application update data:
    selecting an application to update based on received application identification information; and
    storing the application update data in a memory location corresponding to the selected application.

15. The method of claim 14 wherein the at least one data receiving parameter in the broadcast receiver comprises a time for receiving the update data.

16. The method of claim 15 wherein initiating data receipt as a function of the at least one data receiving parameter comprises initiating data receipt at the time to receive the data.

17. The method of claim 14 wherein the at least one data receiving parameter in the broadcast receiver comprises a channel to receive the update data.

18. The method of claim 17 wherein initiating data receipt as a function of the at least one data receiving parameter comprises tuning the broadcast receiver to the channel to receive the data.

19. The method of claim 14 wherein the data comprises a data packet having a header and a payload.

20. The method of claim 19 wherein the payload comprises update software.

21. The method of claim 19 wherein the payload comprises executable code.

22. The method of claim 14 wherein the operation of determining if the data is intended for the digital broadcast receiver comprises determining if the header includes a manufacture identification corresponding with the broadcast receiver.

23. The method of claim 22 further comprising determining if the header includes a product identification corresponding with the digital broadcast receiver.

24. The method of claim 23 further comprising determining if the header includes a specific broadcast receiver identification corresponding with the digital broadcast receiver.

25. The method of claim 14 wherein the operation of storing the data in the broadcast receiver comprises:
  determining if the header includes an application identifier; and
  updating an application in the digital broadcast receiver as a function of the application identifier.

26. The method of claim 14 wherein the operation of storing the data in the broadcast receiver comprises:
  determining if the payload includes profile data;
  determining the at least one memory location to store the profile data; and
  storing the profile data in the least one memory location.

27. The method of claim 26 wherein the operation of determining the at least one memory location to store the profile data comprises:
  determining a starting memory address of the at least one memory location;
  determining a data length of the profile data; and
  storing the profile data in the at least one memory location as a function of the starting memory address and the data length.

28. A computer readable medium containing instructions which, when executed, perform the method of claim 14.

29. A method for receiving user profile update data for selecting a targeted advertisement or application update data at a digital broadcast receiver comprising:
  designating a channel to receive a broadcast transmission;
  selecting the channel containing the broadcast transmission at a predetermined time or during a predetermined period for receiving the user profile update data or application update data;
  extracting the update data from the channel;
  receiving a broadcast transmission;
  determining whether the received broadcast transmission is intended for the digital broadcast receiver;
  determining if the received update data is profile update data or application update data based on a data type parameter in the update data; and
  storing the data in the broadcast receiver based on the data type parameter in the update data.

30. A digital broadcast receiver for receiving user profile update data for selecting a targeted advertisement or application update data comprising:
  means for designating a channel to receive a broadcast transmission;
  means for receiving a broadcast transmission including at least one data packet;
  means for selecting the channel containing the broadcast transmission at a predetermined time or during a predetermined period for receiving user profile update data or application update data;
  means for extracting the update data from the channel;
  means for determining whether the received broadcast transmission is intended for the digital broadcast receiver;
  means for determining if the received update data is profile update data or application update data based on a data type parameter in the update data; and
  means for storing the at least one data packet in the broadcast receiver based on the data type parameter in the update data.

* * * * *